US008149649B1

(12) United States Patent
Brinn et al.

(10) Patent No.: US 8,149,649 B1
(45) Date of Patent: *Apr. 3, 2012

(54) SELF CALIBRATING SHOOTER ESTIMATION

(75) Inventors: Marshall Seth Brinn, Newton, MA (US); James E. Barger, Winchester, MA (US); Stephen D. Milligan, Stow, MA (US)

(73) Assignee: Raytheon BBN Technologies Corp., Cambridge, MA (US)

( * ) Notice: Subject to any disclaimer, the term of this patent is extended or adjusted under 35 U.S.C. 154(b) by 1200 days.

This patent is subject to a terminal disclaimer.

(21) Appl. No.: 11/904,452

(22) Filed: Sep. 27, 2007

Related U.S. Application Data

(60) Continuation of application No. 11/710,044, filed on Feb. 23, 2007, now Pat. No. 7,372,772, which is a division of application No. 10/925,876, filed on Aug. 24, 2004, now Pat. No. 7,190,633.

(51) Int. Cl.
*G01S 3/80* (2006.01)
(52) U.S. Cl. .......................... 367/127; 367/129; 367/906
(58) Field of Classification Search ................. 367/127, 367/129, 906
See application file for complete search history.

(56) References Cited

U.S. PATENT DOCUMENTS

| | | | |
|---|---|---|---|
| 2,435,231 A | 2/1948 | McPherson | |
| 2,963,696 A | 11/1960 | Snyder | |
| 4,283,989 A | 8/1981 | Toulios et al. | |
| 4,813,877 A | 3/1989 | Sanctuary et al. | |
| 4,827,411 A | 5/1989 | Arrowood et al. | |
| 4,970,698 A | 11/1990 | Dumestre, III. | |
| 5,093,824 A | 3/1992 | Coan et al. | |
| 5,241,518 A | 8/1993 | McNelis et al. | |
| 5,243,592 A | 9/1993 | Perlman et al. | |
| 5,280,457 A | 1/1994 | Figueroa et al. | |
| 5,346,210 A | 9/1994 | Utke et al. | |
| 5,392,258 A | 2/1995 | Gabrielson et al. | |
| 5,544,129 A | 8/1996 | McNelis | |
| 5,617,371 A | 4/1997 | Williams | |
| 5,703,321 A | 12/1997 | Feierlein et al. | |
| 5,703,835 A * | 12/1997 | Sharkey et al. | ............... 367/124 |
| 5,742,820 A | 4/1998 | Perlman et al. | |
| 5,777,948 A | 7/1998 | Ferkinhoff et al. | |
| 5,781,505 A | 7/1998 | Rowland | |
| 5,850,592 A | 12/1998 | Ramanathan | |
| 5,878,000 A | 3/1999 | Dubois | |
| 5,878,095 A | 3/1999 | Kainulainen | |

(Continued)

FOREIGN PATENT DOCUMENTS

EP 0447725 A 9/1991

(Continued)

OTHER PUBLICATIONS

"Packet Radio Routing," Gregory S. Lauer, Ch. 11, "Routing in Communications Networks," ed. Martha Steenstrup, Prentice Hall, pp. 352-396 (1995).

(Continued)

*Primary Examiner* — Ian Lobo
(74) *Attorney, Agent, or Firm* — Ropes & Gray LLP

(57) ABSTRACT

Disclosed are systems and methods that can be used to detect shooters. The systems and methods described herein use arrival times of a shockwave, produced by a shot, at a plurality of sensors to assign weights to each of the plurality of sensors, and determine a shot trajectory based on the assigned weights.

10 Claims, 3 Drawing Sheets

U.S. PATENT DOCUMENTS

| | | | |
|---|---|---|---|
| 5,881,246 | A | 3/1999 | Crawley et al. |
| 5,912,862 | A | 6/1999 | Gustavsen et al. |
| 5,913,921 | A | 6/1999 | Tosey et al. |
| 5,920,522 | A | 7/1999 | Levanon et al. |
| 5,930,202 | A | 7/1999 | Duckworth et al. |
| 5,970,024 | A | 10/1999 | Smith |
| 5,973,998 | A | 10/1999 | Showen et al. |
| 6,041,654 | A | 3/2000 | Stake |
| 6,055,523 | A | 4/2000 | Hillis |
| 6,088,622 | A | 7/2000 | Dollin et al. |
| 6,178,141 | B1 | 1/2001 | Duckworth et al. |
| 6,198,694 | B1 | 3/2001 | Kroling et al. |
| 6,223,458 | B1 | 5/2001 | Schwinkendorf et al. |
| 6,349,091 | B1 | 2/2002 | Li |
| 6,370,084 | B1 | 4/2002 | Cray |
| 6,385,714 | B1 | 5/2002 | Li |
| 6,418,299 | B1 | 7/2002 | Ramanathan |
| 6,470,329 | B1 | 10/2002 | Livschitz |
| 6,487,516 | B1 | 11/2002 | Amorai-Moriya |
| 6,563,763 | B2 | 5/2003 | McNelism |
| 6,621,764 | B1 | 9/2003 | Smith |
| 6,745,224 | B1 | 6/2004 | D'Souza et al. |
| 6,847,587 | B2 | 1/2005 | Patterson et al. |
| 6,965,312 | B2 | 11/2005 | Lerg |
| 6,965,541 | B2 | 11/2005 | Lapin et al. |
| 6,977,937 | B1 | 12/2005 | Weinstein et al. |
| 7,054,228 | B1 | 5/2006 | Hickling |
| 7,126,877 | B2 | 10/2006 | Barger et al. |
| 7,139,222 | B1 | 11/2006 | Baxter et al. |
| 7,162,043 | B2 | 1/2007 | Sugiyama et al. |
| 7,190,633 | B2 | 3/2007 | Brinn et al. |
| 7,203,132 | B2 | 4/2007 | Berger |
| 7,266,045 | B2 | 9/2007 | Baxter et al. |
| 7,292,501 | B2 | 11/2007 | Barger |
| 7,362,654 | B2 | 4/2008 | Bitton |
| 7,372,772 | B2 | 5/2008 | Brinn et al. |
| 7,372,773 | B2 | 5/2008 | Horak |
| 7,372,774 | B1 | 5/2008 | Uzes |
| 7,408,840 | B2 | 8/2008 | Barger et al. |
| 7,411,865 | B2 | 8/2008 | Calhoun |
| 7,420,878 | B2 | 9/2008 | Holmes et al. |
| 7,433,266 | B2 | 10/2008 | Ledeczi et al. |
| 7,474,589 | B2 | 1/2009 | Showen et al. |
| 7,495,998 | B1 | 2/2009 | Deligeorges et al. |
| 7,502,279 | B2 | 3/2009 | Wignall et al. |
| 7,532,542 | B2 | 5/2009 | Baxter et al. |
| 2002/0003470 | A1 | 1/2002 | Auerbach |
| 2002/0029214 | A1 | 3/2002 | Yianilos et al. |
| 2004/0100868 | A1 | 5/2004 | Patterson, Jr. et al. |
| 2004/0246902 | A1 | 12/2004 | Weinstein et al. |
| 2005/0194201 | A1 | 9/2005 | Tenghamn et al. |
| 2005/0237186 | A1 | 10/2005 | Fisher et al. |
| 2006/0044941 | A1 | 3/2006 | Barger et al. |
| 2006/0256660 | A1 | 11/2006 | Berger |
| 2007/0030763 | A1 | 2/2007 | Barger et al. |
| 2007/0230269 | A1 | 10/2007 | Ledeczi et al. |
| 2007/0237030 | A1 | 10/2007 | Barger et al. |
| 2008/0008044 | A1 | 1/2008 | Patterson et al. |
| 2008/0084473 | A1 | 4/2008 | Romanowich |
| 2008/0159078 | A1 | 7/2008 | Barger et al. |
| 2008/0162089 | A1 | 7/2008 | Barger et al. |
| 2008/0298176 | A1 | 12/2008 | Fisher et al. |
| 2009/0086577 | A1 | 4/2009 | Ledeczi et al. |

FOREIGN PATENT DOCUMENTS

| | | |
|---|---|---|
| GB | 2 015 127 A | 9/1979 |
| GB | 2181239 | 4/1987 |
| GB | 2181240 | 4/1987 |
| JP | H02-71114 U | 5/1990 |
| JP | H07-505219 A | 6/1995 |
| JP | H10-509793 A | 9/1998 |
| JP | H10-332806 | 12/1998 |
| JP | 2000-205794 A | 7/2000 |
| WO | WO-0137483 A | 5/2001 |
| WO | WO-02/082097 | 10/2002 |
| WO | WO-2009046367 | 4/2009 |
| WO | WO-2009053702 | 4/2009 |
| WO | WO-02082097 | 10/2009 |

OTHER PUBLICATIONS

"The Organization of Computer Resources into a Packet Radio Network," R.E. Kahn, IEEE Trans. on Communications. COM-25:1, 169-78 (Jan. 1977).

"The DARPA Packet Radio Network Protocols," J. Jubin et al., Proc. of the IEEE, 75:1, 21-32 (Jan. 1987).

"Analysis of Routing Strategies for Packet Radio Networks," J.J. Garcia Lune Aceves et al., Proc. of the IEEE INFOCOM '85, Washington, DC, 292-302 (185).

"Packet Radio Network Routing Algorithms: A Survey," J.J. Hahn et al., IEEE Communications Magazine, 22:11, 41-7 (Nov. 1984).

"Link-State Routing," John Moy, Ch. 5, "Routing in Communications Networks," ed. Martha Steenstrup, Prentice Hall, pp. 136-157 (1995).

Pecina, J.N., "Unmanned Navigation with a Novel Laser and a Smart Software," Aerospace Conference, 2003. Proceedings. 2003 IEEE, vol. 1, Mar. 8-15, 2003 pp. 305-312.

Pierce, Allan D., "Nonlinear Effects in Sound Propagation," Acoustics, McGraww-hill Book Company, 1981, pp. 611-614.

Kalyanmoy Deb, "Mult-Objective Optimization Using Evolutionary Algorithms," John Wiley & Sons, Ltd., (2001), pp. 85-101.

Ledeczi et al. Multiple Simultaneous Acoustic Source Localization in Urban Terrain. Institute for Software Integrated Systems. pp. 491-496. ISBN# 0-7803-9201-9.

Molnar et al, "Muzzle Blast Detection Via Short Time Fourier Transform", Feb. 2005, Vanderbilt University, pp. 1-2.

Karsai et al, A Model-based Front-end to TAO/ACE: The Embedded System Modeling Language Institute for Software-Integrated Systems, Vanderbilt University (2008).

Collings, S.W., "Acoustic Beamforming on Wireless Sensor Nodes", Thesis submitted to the Faculty of the Graduate School of Vanderbilt University, May 2008.

Livingston, et al, "An augmented reality system for military operations in urban terrain", Proceedings of the Interservice/Industry Training, Simulation & Education Conference (I/ITSEC '02), Dec. 2-5, 2002.

Julier, et al, "BARS: Battlefield Augmented Reality System", Advanced Information Technology, Naval Research Laboratory (2007 ??????).

"Countersniper System", ISIS, 2008; Vanderbilt University/School of Engineering, retrieved from http://www.isis.vanderbilt.edu/projects/countersniper on Aug. 6, 2009.

Chadha, Ankit, "Development of a new technology for sound source localisation", Thesis submitted to the Faculty of the Graduate School of Wayne State University, Detroit, Michigan (2007).

Kusy, et al, "Elapsed time on arrival: a simple and versatile primitive for canonical time synchroniaation services", Int. J. Ad Hoc and Ubiquitous Computer, vol. x, No. x, 200x (2006).

Boggs, Jeffrey A., "Geolocation of an Audio Source in a Multipath Environment Using Time-of-Arrival" Air Force Institute of Technology, Graduate School of Engineering and Management Mar. 2003-Mar. 2004.

Ledeczi, et al, "Multiple Simultaneous Acoustic Source Localization in Urban Terrain", Institute for Software Integrated Systems, Vanderbilt University (2005).

Salisbury, David F, "Network turns soldiers' helmets into sniper location system", Phys.Org.com, retrieved from http://www.physorg.com/news157123967.html on Aug. 7, 2009.

Chu, et al, "Semantic context detection using audio event fusion: Camera-ready version", EURASIP Journal on Applied Signal Processing, vol. 2006, Article ID 27390, pp. 1-12.

Martinez, et al, "Sensor network applications", IEE Computer Society, vol. 37, No. 8, Aug. 2004.

Kushwaha, et al, "Sensor Node Localization Using Mobile Acoustic Beacons". Institute for Software Integrated Systems, Vanderbilt University (2005).

Volgyesi, et all, "Shooter localization and weapon classification with soldier-wearable networked sensors", Institute for Software Integrated Systems, Vanderbilt University (2008).

Stephen, Tan Kok Sin, "Source Localization Using Wireless Sensor Networks", Naval Postgraduate School, Jun. 2006.

Marano, et al, "Support-based and ML approaches to DOA estimation in a dumb sensor network", IEE Transactions on Signal Processing, vol. 54, No. 4, Apr. 2006.

Chu, et al, "Toward semantic indexing and retrieval using hierarchical audio models", Multimedia Systems (2005) 10(6): 570-583; Received: Apr. 16, 2004 / Revised: Nov. 20, 2004 / Published online: May 10, 2005.

Balogh, et al, "Wireless Sensor Network-Based Projectile Trajectory Estimation", Institute for Software Integrated Systems, Vanderbilt University (2008).

Maroti, et al, "Shooter Localization in Urban Terrain", Vanderbilt University, Aug. 2004.

Danicki, E., "The shock wave-based acoustic sniper localization", Elsevier, 2005.

Stoughton, R.B., "SAIC Sentinel Acoustic Counter-Sniper System," Proceedings of SPIE, vol. 2938, Nov. 19, 1996, pp. 276-284, XP00251780, Section 3.

European Search Report in European Application No. EP08004009 dated Mar. 11, 2009.

Maroti et al., "Shooter Localization in Urban Terrain", Computer, 37:8, Aug. 2004, pp. 60-61.

Danicki, "The shock wave-based acoustic sniper localization," Nonlinear Analysis, 65 (2006), pp. 956-962.

Mays, Brian T., "Shockwave and Muzzle Blast Classification via Joint Time Frequency and Wavelet Analysis," Sep. 30, 2001, US Army Publication, pp. 1-14.

US 5,168,475, 12/1992, McNelis et al. (withdrawn)

* cited by examiner

SELF CALIBRATING SHOOTER ESTIMATION

CROSS-REFERENCE TO RELATED APPLICATIONS

This application is a continuation application of U.S. patent application Ser. No. 11/710,044, filed Feb. 23, 2007, which is a divisional application of U.S. patent application Ser. No. 10/925,876, filed Aug. 24, 2004, the entire contents of which are incorporated herein by reference.

BACKGROUND OF THE INVENTION

The present invention relates to law enforcement technologies and security, and more particularly to methods and systems for estimating the location of a shooter firing a supersonic projectile based on shockwave-only information.

Systems and methods are known that can determine the general direction and trajectory of supersonic projectiles, such as bullets and artillery shells, by measuring parameters associated with the shockwave generated by a projectile. One such system, described in U.S. Pat. No. 5,930,202 utilizes a distributed array of acoustic sensors to detect the arrival times, amplitudes and frequency characteristics of a projectile's shockwave and the muzzle blast from a firearm. The time of arrival (TOA) information for the shockwave can be used to determine the projectile's trajectory: azimuth, elevation, and intercept with an arbitrary plane in the system coordinate frame. With additional information from the muzzle blast, an accurate location of the origin of the projectile and a line of bearing to the origin of the projectile can be determined. When the muzzle blast is masked, shadowed, silenced or otherwise distorted, at least the bullet trajectory can be estimated from the shockwave alone.

Conventional systems typically employ an antenna with a plurality of acoustic sensors, which can be relatively closely spaced (e.g., 1 meter apart) or widely dispersed (e.g., mounted on a vehicle or carried by soldiers on a battlefield), with each sensor measuring shockwave pressure omni-directionally at its respective location. One exemplary antenna may include, for example, a total of 7 omni-directional microphones, with 6 microphones distributed over the surface of a sphere (approx. diameter 1 m) and the seventh microphone located in the center of the sphere. An arrangement with less than 7 sensors can produce objectionable lobes in the spatial sensitivity pattern of the sensor array.

Sensor positions can shift over the service life of a deployed system and/or sensor performance can degrade over time for various reasons. Occasionally, some sensors may stop operating altogether.

It would therefore be desirable to provide a system and method that compensates for changes in sensor position and sensor performance by calibrating themselves automatically or with operator assistance.

SUMMARY OF THE INVENTION

The invention is directed to a method for calibrating sensor positions based on shock and muzzle measurements processed from a series of shots fired from a known location and in a known direction, as well as an approach for dynamically adapting shock-only shooter estimation algorithms to compensate for sensor degradation and/or loss.

According to one aspect of the invention, a method for calibrating relative sensor positions of sensors in a shooter detection system includes the steps of determining approximate relative location information of the sensors, firing at least two shots having different known shooter positions and known bullet trajectories, determining a time difference between a muzzle-blast arrival time and a shockwave arrival time for each of the sensors and for each shot, and determining the relative sensor positions that produce a minimum residual of the time differences for the at least two shots.

Embodiments of the invention may include determining the relative sensor positions by a least-squares search. The least-squares search can be initialized from a previous known location of the sensors or alternatively from an approximately measured location of the sensors. Any one of the sensors can be selected as a reference sensor and the relative muzzle-blast arrival times and shockwave arrival times can be computed for each sensor relative to the reference sensor.

According to another aspect of the invention, a method for compensating for sensor degradation in a multi-sensor shooter detection system includes the steps of determining a time of arrival of shockwaves produced at the sensors by incoming shots, performing a least-squares regression for the shockwave arrival times at the sensors to determine a time residual, observing a contribution of each of the sensors to the time residual for a plurality of shots, and assigning a weight for each sensor, said weight being inversely proportional a contribution of said sensor to the time residual.

Embodiments of the invention may include normalizing the contribution to an observed maximum time of arrival difference. In addition, a weighted shockwave arrival time can be computed that enhances a contribution from sensors that have a greater reliability. With this approach, the shooter position and bullet trajectory can be determined from a time residual computed with the weighted shockwave arrival time. Any weight that has been changed due to sensor malfunction can be adjusted when the sensor has been repaired.

Further features and advantages of the present invention will be apparent from the following description of preferred embodiments and from the claims.

BRIEF DESCRIPTION OF THE DRAWINGS

The following figures depict certain illustrative embodiments of the invention in which like reference numerals refer to like elements. These depicted embodiments are to be understood as illustrative of the invention and not as limiting in any way.

DETAILED DESCRIPTION OF CERTAIN ILLUSTRATED EMBODIMENTS

The invention is directed to systems and methods that are able to compensate for changes in the position and performance of acoustic sensors that detect shockwave signals from a supersonic projectile to determine the projectile's trajectory. In particular, the systems and methods described herein can calibrate themselves automatically or with operator assistance in the event that one or more sensors change their relative position, malfunction or fail.

Generally, an acoustic system for shooter localization according to the invention utilizes a widely distributed array of acoustic sensors that detect the leading edge of a projectile's shockwave and the muzzle blast from the apparatus used to launch the projectile, for instance a rifle. The wave arrival times of the shockwave and muzzle blast are measured for each waveform type at the sensors. This time of arrival (TOA) information for the shockwave and blast wave can be used to determine the projectile's trajectory, a line of bearing to the origin of the projectile, and the distance from a sensor to the shooter.

Although ideally the shock waveform contains useful information about the distance the shockwave has propagated, realistically the shock waveform will often be contaminated by ground reflections and forward scattering and other multi-path propagation, so that it can be difficult to reliably extract distance information solely from shock waveform shape or duration. For trajectory estimation, the system relies primarily upon measuring arrival time of the waveform based on leading edge detection, as the leading edge is not corrupted by multi-path propagation.

These same sensors that detect the shockwave can be used to localize the muzzle blast if the muzzle blast signal at the sensors is sufficiently discernable from the shockwave and if the muzzle blast signal can be assumed to travel a direct line-of-sight between the muzzle and the sensors. The ability to localize the muzzle blast is used in conjunction with the shockwave information to very accurately locate the projectile's origin. However, relying solely on muzzle blast may not be a reliable measure for locating the projectile's origin, as it is possible to silence the blast. Furthermore, the muzzle blast can be attenuated by interfering manmade structures (e.g. buildings) or natural structures (e.g. hills). Therefore, in actual deployment of the system, muzzle blast information is used secondarily to the shockwave information. However, a signal from a controlled muzzle blast can be used to calibrate the system.

Figure 1:
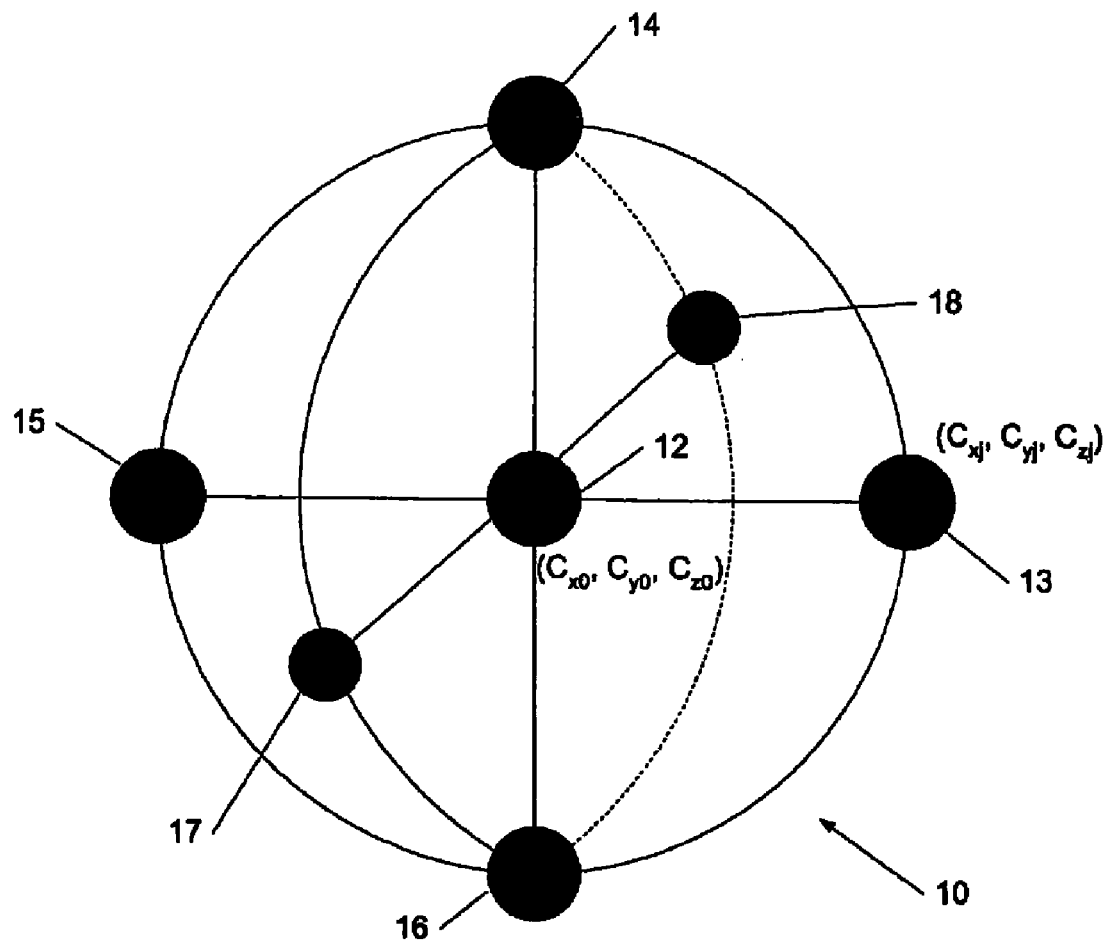
FIG. 1 shows schematically an exemplary sensor array with 7 omni-directional acoustic sensors.

An acoustic counter shooter system according to the invention is generally illustrated in FIG. 1. The depicted exemplary embodiment of an acoustic sensor array 10 includes seven sensors 12, 13, 14, 15, 16, 17, 18, for example, omni-directional microphones. Advantageously, the sensors 13 to 18 can be uniformly spaced on a sphere having a diameter of, for example, 1 meter, with sensor 12 located in the center of the sphere, although other sensor configuration are also feasible. The coordinates of the sensors relative to the center of the sphere (Cx0, Cy0, Cz0) are indicated as (Cxj, Cyj, Czj). The signal from the exemplary configuration with seven sensors can provide a substantially spatially uniform sensitivity of the sensor array, regardless of the angle of incidence of the shockwave relative to the coordinate axes of the array, if the response function of the sensor, i.e., the transfer function {output voltage}/{sound pressure}, is identical or at least known and constant for all sensors. It has been found that, in principle, five sensors are sufficient to determine the angle of incidence in space; however, a 5-element sensor array may lack directional uniformity, with certain directions having a high sensitivity and other directions where only a weak signal can be detected.

Figure 2:
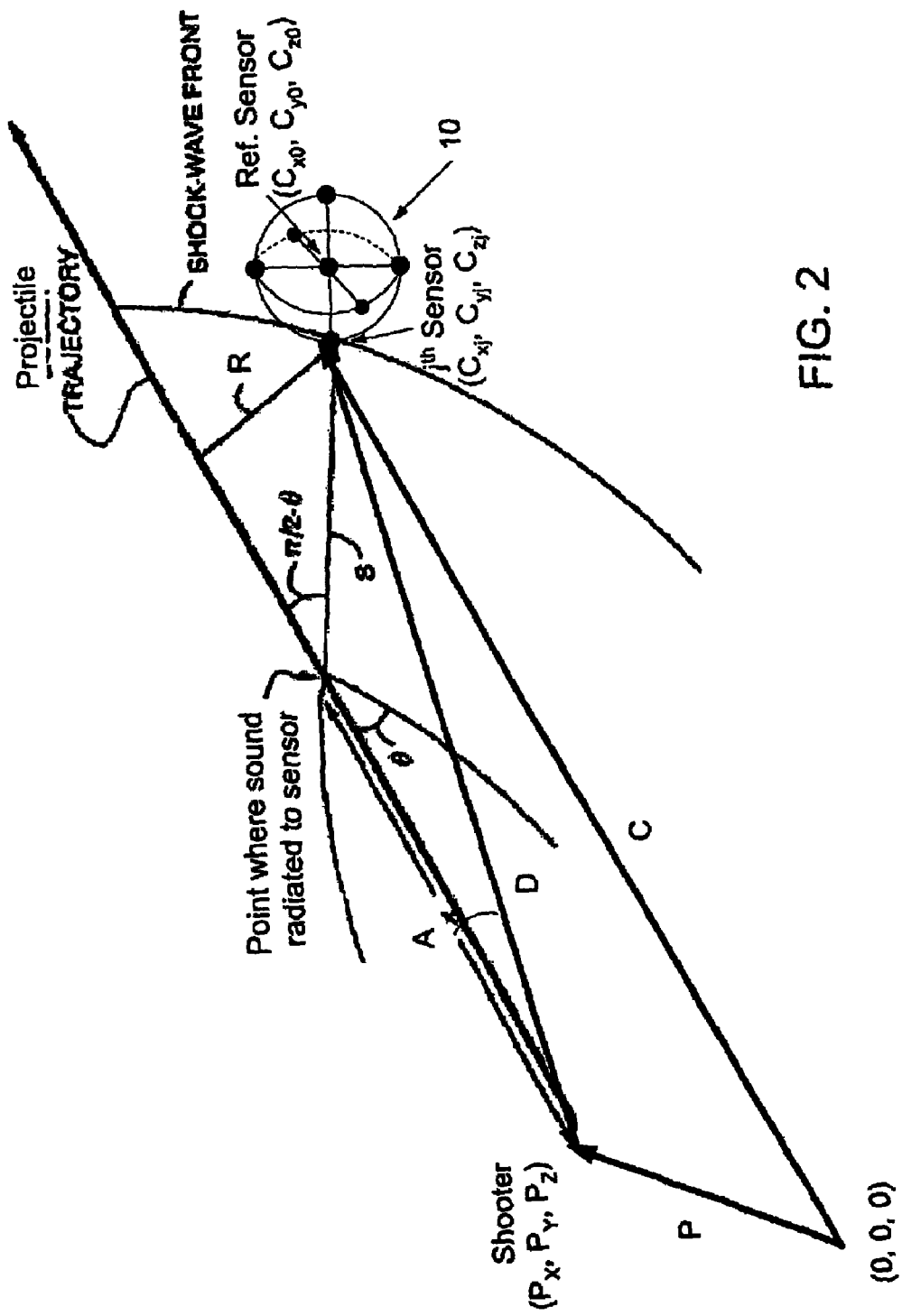
FIG. 2 is a schematic diagram of a shockwave Time-of-Arrival (TOA) model.

Referring now to FIG. 2, a Time of Arrival (TOA) model, which is described in more detail in U.S. Pat. No. 6,178,141 (incorporated herein by reference in its entirety), is used to estimate the trajectory of the projectile and the shooter direction relative to the sensor location. The TOA model is based on an accurate ballistic model taking into account certain physical characteristics relating to the projectile, including: the air density (which is related to temperature); the Cartesian position (Px, Py, Pz) of a shooter; the azimuth and elevation angles of the rifle muzzle; the muzzle velocity of the projectile (Mach number); and the speed of sound (which varies with temperature/air density). With this ballistic model, it is possible to accurately calculate, at any particular point in space, the exact time at which the shockwave (and muzzle blast, if used) reach a particular point in space.

Measurements of a shockwave's pressure and arrival time at five or more of the aforedescribed sensors are sufficient to determine uniquely the shooter location, bullet trajectory, and caliber. As depicted in the diagram of FIG. 2, the shooter is located at point P (PX, PY, PZ) relative to an origin (0, 0, 0), the various sensors are located at points C (Cxj, Cyj, Czj), and the bullet trajectory is shown emanating from the shooter in the direction of $|\vec{A}_j|$, where the index j refers to the jth sensor. The vector distance between the shooter and jth sensor is $|\vec{D}_j|$, the closest point of approach (CPA) of the bullet to the jth sensor is $|\vec{R}_j|$, and the path followed from the point where the shockwave is radiated from the trajectory to the jth sensor is $\vec{S}_j$. The Mach angle of the bullet is $\theta=\sin^{-1}(1/M)$, $M=V/c_0$. M is the Mach number of the projectile, V is the supersonic velocity of the projectile, and c0 is the (pressure- and temperature-dependent) speed of sound. The 'miss-angle' between trajectory and the jth sensor is γi. The trajectory is characterized by its azimuth angle α measured counter-clockwise from the x-axis in the x-y plane and by its elevation angle φ measured upward from the x-y plane. The equations that define the shockwave arrival time tj and unit vector at the jth sensor are written in terms of these geometrical quantities.

The time of arrival is equal to the time $$\frac{|\vec{A}_j|}{V}$$

it takes for the projectile to travel the distance $|\vec{A}_j|$ to the point were sound is radiated toward the $j^{th}$ sensor, plus the time it takes the shockwave to travel the distance $|\vec{S}_j|$ from that radiation point to the $j^{th}$ sensor, $$\frac{|\vec{S}_j|}{c_0}.$$

$$t_j = t_0 + \frac{|A_j|}{V} + \frac{|S_j|}{c_0} = t_0 + \frac{|D_j|}{c_0}\sin(\gamma_j + \theta), \quad (1)$$

wherein $t_0$ is a time reference (firing time). The closest point of approach (CPA) between the projectile trajectory and the $j^{th}$ sensor is $$|\vec{R}_j| = |\vec{D}_j|\sin(\gamma_j) \quad (2)$$

Figure 3:
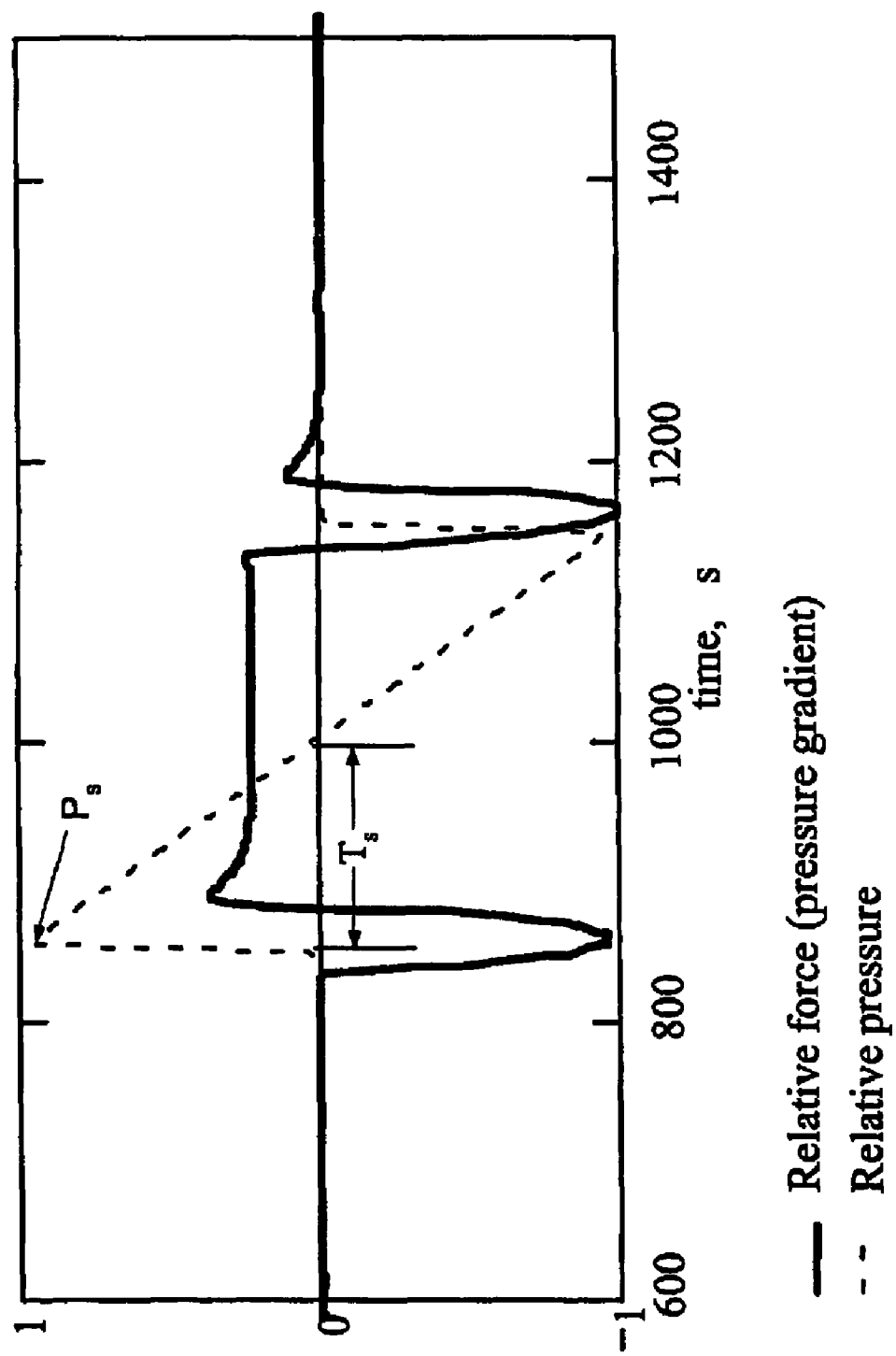
FIG. 3 shows the pressure of a shockwave emanating from a projectile.

The CPA (or $|\vec{R}_j|$) can be independently determined from the measured slope of the shockwave depicted in FIG. 3 by the following equation:

$$|\vec{R}_j| = \frac{\rho c^3 \sqrt{M_j^2 - 1}}{2\beta M_j (P_s/T_s)_j} \quad (3)$$

$M_j$ is the projectile's Mach number at the point where sound is radiated to the $j^{th}$ sensor along the projectile's trajectory $|\vec{A}_j|$ and $\rho$, $c_0$, $\beta$ are the atmospheric density, speed of sound, and non-linear parameter $\beta \cong 1.3$. The speed of sound $c_0$ varies with temperature as $c_0 = 20.05\sqrt{T_{Kelvin}}$ (m/s). The slope of the shockwave is defined by its peak pressure $P_s$ divided by the half-span $T_s$ (see FIG. 3).

The velocity V of the projectile can be assumed to be constant along its trajectory, if the sensors are closely spaced, so that there is insignificant loss of speed between the times the projectile radiates to the different sensors. In a more general case, however, a mathematical ballistics model that predicts the arrival time of a shockwave at any general point in space as a function of the full set of parameters can be used. It is derived from physical principles, and has an accuracy of approximately 10 parts per million (ppm). The mathematical model is described in detail in U.S. Pat. No. 6,178,141, the content of which is incorporated herein by reference in its entirety. For comparison, conventional empirically derived ballistic models have nominal 1 m accuracy at 1 km, or 1000 ppm.

The ballistic model includes the bullet drag coefficient $C_b$, which depends upon the projectile's caliber. The caliber may be estimated from either the peak pressure $(P_s)$ or the half-span $(T_s)$ recorded at the $j^{th}$ sensor, using the following equation that depends on certain parameters of the projectile, such as its cross sectional area S, its length L, and a constant K that depends on projectile's shape.

$$(T_s)_j = \frac{2^{0.75} \beta^{0.5} M_j S^{0.5} K \cdot |R_j|^{0.25}}{L^{0.25} c_0 (M_j^2 - 1)^{3/8}}. \quad (4)$$

Once the caliber is found, its unique drag coefficient $C_b$ is known. This parameter is important in the ballistic model prediction of projectile's trajectory. In the context of the present discussion, the drag coefficient is assumed to be proportional to the square root of Mach number M. A more accurate model is described in U.S. Pat. No. 5,930,202, the content of which is incorporated herein by reference in its entirety. The distance $|\vec{A}_j|$ and the time $t_j^{Aj}$ to reach the point where sound is radiated to the $j^{th}$ sensor are defined in terms of the initial muzzle velocity $V_0$, the local velocity $V = Mc_0$, and drag coefficient $C_b$.

$$|\vec{A}_j| = C_b(\sqrt{V_0} - \sqrt{c_0 / \sin(\theta_j)}) \quad (5)$$

$$t_j^{A_j} = \frac{|\vec{A}_j|}{V_0 - \sqrt{V_0} |\vec{A}_j|/C_b}$$

The sensor arrangement of FIG. 1 is used to measure the Time-Difference-of-Arrival (TDOA) between the different sensors 12 to 18. Accordingly, seeking to solve for shooter position and shot trajectory relies heavily on an accurate knowledge of the relative positions of the sensors 12 to 18 in 3-dimensional space. Further, the measurements of shock TOA should be unbiased across all sensors and should be able to compensate for changes in the sensor sensitivity over time.

The relative positions in space of the sensors may change over time due to mechanical changes, such as bending or other transformations, thereby degrading the accuracy of estimation of the shooter position from TDOA differences. It is therefore important to be able to accurately calibrate the sensor positions in the field, either in scheduled intervals or when otherwise warranted, for example, when erroneous measurements are suspected.

As described in U.S. Pat. No. 5,930,202, the exact sniper position along the bullet trajectory can be computed if the muzzle blast wave can be reliably detected in addition to the projectile's shockwave, assuming that the sensor coordinates are accurately known. It should be noted, however, that only the relative positions of the sensors, and not their absolute positions in space, are required. In the present approach, the inverse problem is solved in that the relative coordinates of the sensors in space are determined from a known shooter position and the detected shockwave.

The exemplary sensor array 10 of FIG. 1 has n=7 sensors; one of the sensors, for example, the sensor 12 located at the center of sensor array 10, can be arbitrarily selected as a reference sensor with coordinates $(Cx_0, Cy_0, Cz_0)$, so that there are (n−1)=6 relative sensors having relative sensor positions $(Cx_j, Cy_j, C_j)$, j=1, . . . , 6. The total number of relative coordinates of the sensor array 10 in 3-dimensional space is therefore (n−1)*3=18. The muzzle blast arrival times $t_{muzzle}$ and the shockwave arrival times $t_{shock}$ are recorded for each of the other 6 sensors relative to those of the reference sensor for at least three shots with different known shooter positions and bullet trajectories. The point in the sensor array against which the shooter's azimuth and elevation angles are to be measured can be, for example, the aforementioned reference sensor designated as the origin $(Cx_0, Cy_0, Cz_0)$ of a Cartesian system. Three shots produce a total of 42 different arrival time measurements (21 muzzle and 21 shock) relative to a firing time $t_0$. Accordingly, for a sensor configuration with n sensors and m shots fired, there are (n−1)*3 unknowns (the coordinates $(Cx_j, Cy_j, C_j)$ of the j sensors relative to $(Cx_0, Cy_0, Cz_0)$) and 2*m*(n−1) measured parameters, there is enough additional information to allow for a least-squares approach that can smooth out deviations of the shot (shooter position and bullet trajectory) from the assumed parameters. At least two shots are required to allow for solving the system of equations, but three are recommended to allow greater smoothing of measurement noise. The shots should be taken in a clean acoustic environment, so that both shock and muzzle blast can be accurately detected.

In other words, by adding the muzzle-blast equation $t_{muzzle} = t_0 + |\vec{D}|/c$ to the equations (1) or (5) above, the (n−1) relative sensor positions $(Cx_j, Cy_j, Cz_j)$ (j=1, . . . , 6) that best fit the shock and muzzle-blast times $\Delta t_{muzzle}$ and $\Delta t_{shock}$ for the three shots can be determined, for example, by a least-squares gradient search method or by a genetic algorithm (GA). The gradient search is initialized from the last measured or other presumably accurate locations of each sensor.

The least-squares gradient search method or the genetic algorithm (GA) attempt to minimize the RMS residual fit to all the relative sensors positions $(Cx_j, Cy_j, Cz_j)$ relative to the reference sensor.

The RMS residual is defined as $$\Delta \tau_{min} = \sqrt{\sum_j \left\{ (\Delta \tau_{muzzle,calc}^j - \Delta \tau_{muzzle,meas}^j)^2 + (\Delta \tau_{Shock,calc}^j - \Delta \tau_{Shock,meas}^j)^2 \right\}} \quad (6)$$

It has been found that the sensor positions relative to the reference sensor can be computed quickly and reliably by using an evolutionary genetic algorithm (GA). GAs mimic natural evolutionary principles and apply these to search and optimization procedures. Most classical point-by-point algorithms use a deterministic procedure for approaching the optimum solution, starting from a random guess solution and specifying a search direction based on a pre-specified transition rule, such as direct methods using an objective function and constraint values and gradient-based methods using first and second order derivatives. However, the latter methods have disadvantages, for example, that an optimal solution depends on the selected initial solution and that most algorithms get "stuck" at a sub-optimal solution.

Unlike classical search and optimization methods, a GA begins its search with a random set of solutions, instead of just one solution. Once a random population of solutions is created, each is evaluated in the context of the nonlinear programming problem and a fitness (relative merit) is assigned to each solution. In one embodiment, the fitness can be represented by the Euclidean distance between a calculated solution and the measured solution, as defined in Eq. (6) above. Intuitively, an algorithm producing a small value of $\Delta\tau_{min}$ is better.

When applying the GA to arrive at a solution for the sensor location, the GA uses as a chromosome an initial population of sensor coordinates that can be randomly selected or can have values representing previously measured and/or otherwise determined or estimated sensor locations. Typically, a maximum number of iterations for the GA is performed.

For example, in each generation, the "best" individual is allowed to survive unmutated, whereas e.g. the top 100 individuals, as judged by their fitness, also survive, but are used to create the next 100 individuals from pairs of these survivors using crossover/mutation/reproduction operators, as described for example in Kalyanmoy Deb, *Multi-Objective Optimization Using Evolutionary Algorithms*, John Wiley & Sons, New York.

While least-squares estimation algorithms are robust to Gaussian noise in the measurement of shockwave TOA, any consistent bias in these measurements, for example, due to changes in sensor sensitivity over time, will impact the reliability of the localization estimation. Moreover, a partial or complete loss of a sensor can undermine any assumptions of symmetry that may be inherent in such algorithms.

One approach to correct for sensor degradation/loss is to observe the contribution $|\tau_{Shock,calc}^j - \tau_{Shock,meas}^j|$ from each of the sensors over time to the residual expression $$\Delta\tau_{min} = \sqrt{\sum_j (\tau_{Shock,calc}^j - \tau_{Shock,meas}^j)^2}. \quad (7)$$

The time of arrival $\tau_{Shock}^j$ is recorded for each sensor and for each incoming and processed shot. If all sensors respond properly, then the values $|\tau_{Shock,calc}^j - \tau_{Shock,meas}^j|$ can be expected to have a random distribution. However, if certain sensors consistently contribute more than their expected share to the residual sum, then their operability and reliability may be in question, and their contribution to the computed residual should be decreased accordingly. Conversely, the contribution of a sensor that consistently contributes more than its expected share should be decreased. This can be accomplished by assigning a weight $W_i$ to each sensor that is inversely proportional the sensor's mean contribution to the residual over a running window that includes, for example, the last N shots.

If, as mentioned above, the performance of the array in detecting particular shots is affected by loss of symmetry, then the maximum possible value of $\Delta\tau_{max}$ will be less for certain shots than for other shots, depending on how the shockwave propagates across the sensors. That is, certain shots will make the array appear shorter, while other shots will make the array appear longer. In computing the running average contribution of sensors to the residual, these contribution can be normalized with respect to a maximum possible $\Delta\tau_{max}$ for that shot to allow for consistent comparison of missed-TOA across different shots of different geometries.

In other words, instead of minimizing the value of the residual of Eq. (7), the value of $$\Delta\tau_{min} = \frac{\sqrt{\sum_j \{(\tau_{Shock,calc}^j - \tau_{Shock,meas}^j) * W_i\}^2}}{\tau_{max}} \quad (8)$$

is minimized. The effect of weighting the residual function by $W_j$ is to give greater contribution to those sensors which are showing greater reliability over recent shots, i.e., contribute less to the residual $\Delta\tau_{min}$. This approach has the benefit that as performance of a given sensor improves (it may be suffering, for example, from an intermittent glitch) the weighted average will, over time, restore its contributions to full weight. When a sensor is repaired or replaced, the weights can be explicitly reset to full value. No other changes in the optimization algorithm are required.

While the invention has been disclosed in connection with the preferred embodiments shown and described in detail, various modifications and improvements thereon will become readily apparent to those skilled in the art. Accordingly, the spirit and scope of the present invention is to be limited only by the following claims.

What is claimed is:

1. A method for operating a multi-sensor shooter detection system, comprising
   providing a plurality of sensors,
   determining arrival times of a shockwave produced by a shot at each of the plurality of sensors,
   determining a time residual based at least in part on the arrival times,
   determining a contribution of each the arrival times to the time residual,
   assigning a weight to each of the plurality of sensors based on the contribution, and
   determining a shot trajectory based on the weight.

2. The method of claim 1, wherein assigning a weight includes assigning a weight to each of the plurality of sensors that is inversely proportional to the contribution of the arrival times of the corresponding ones of the plurality of sensors to the time residual.

3. The method of claim 1, further comprising the step of normalizing the contribution to an observed maximum arrival time difference.

4. The method of claim 1, further comprising the step of computing a weighted shockwave arrival time that enhances a contribution from sensors that have a greater reliability.

5. The method of claim 4, further comprising determining a shooter position from a time residual computed with said weighted shockwave arrival time.

6. The method of claim 1, further comprising adjusting the weight of a sensor when the sensor has been repaired.

7. The method of claim 1, wherein the sensor is an acoustic sensor.

8. The method of claim 7, wherein the acoustic sensor is a microphone.

9. The method of claim 1, wherein determining the time residual includes performing least-squares regression for the arrival times.

10. The method of claim 1, wherein the trajectory comprises a trajectory of one of the shot and a subsequent shot.

* * * * *